United States Patent [19]

Ross

[11] 4,209,831
[45] Jun. 24, 1980

[54] METHOD AND APPARATUS FOR CONTROLLING AN INTERCONNECTED DISTRIBUTION SYSTEM WHICH INCLUDES A JOINTLY OWNED GENERATING UNIT

[75] Inventor: Charles W. Ross, Hatboro, Pa.

[73] Assignee: Leeds & Northrup Company, North Wales, Pa.

[21] Appl. No.: 939,643

[22] Filed: Sep. 5, 1978

[51] Int. Cl.² .................................................. G06F 15/56
[52] U.S. Cl. .................................... 364/492; 364/107; 364/300
[58] Field of Search ............... 364/492, 418, 464, 300, 364/493, 107; 237/2 R; 307/11, 31

[56] References Cited

U.S. PATENT DOCUMENTS

| | | | |
|---|---|---|---|
| 3,913,829 | 10/1975 | Fink | 364/493 |
| 4,023,043 | 5/1977 | Stevenson | 364/493 |
| 4,069,675 | 1/1978 | Adler et al. | 364/492 |

OTHER PUBLICATIONS

Might et al., "An Algorithm for Multi-Company Regulating Control of Commonly Owned Generating Units".

Liank et al., IEEE Control of Power Systems Conf. and Exposition, Mar. 1-3, 1978, Oklahoma City, Section IEEE, Record No. 78 CH 1282-1283, Reg. 5, pp. 7-11.

Podmore et al., "Automatic Generation Control of Jointly-Owned Generating Units", IEEE Paper No. F78 088-7, IEEE PES Winter Meeting, N.Y., Jan. 29–Feb. 3, 1978.

Primary Examiner—Errol A. Krass
Attorney, Agent, or Firm—William G. Miller, Jr.; Raymond F. MacKay

[57] ABSTRACT

In a power distribution system comprising interconnected distribution areas which includes a jointly owned unit, that jointly owned unit is controlled to allocate regulating outputs for the areas participating in the joint ownership in accordance with the percentage of ownership, the amount and direction of change in generation requested by the participating areas and the rate limited capability of the unit.

2 Claims, 5 Drawing Figures

METHOD AND APPARATUS FOR CONTROLLING AN INTERCONNECTED DISTRIBUTION SYSTEM WHICH INCLUDES A JOINTLY OWNED GENERATING UNIT

BACKGROUND OF THE INVENTION

This invention relates to the control of the output of a jointly owned generating unit as part of a method for controlling the power flow between interconnected power distribution areas which are individually controlled to maintain their tie line interchange at a preset value while maintaining the system frequency at its preset value. It is desired to allocate a part of the generation of the jointly owned unit to each of the joint owners so as to provide them with regulating output from that unit.

The problem relating to jointly owned regulating units has arisen by virtue of the fact that a number of jointly owned generating units have been installed by utilities as a means of benefiting from the capital and operating economics of larger scale units while at the same time avoiding over-commitment in generating capacity. During the initial years of the installation of jointly owned units, those units were wholly base-loaded at their maximum output level. However, recently utilities have installed jointly owned units to such an extent that those units, when combined with the nuclear units, which did not lend themselves to automatic generation control, constituted such a percentage of the system capacity that there remained insufficient regulating capacity. As a result the joint owners found it necessary to control the output of the jointly owned units so that the joint owners had a share of the jointly owned capacity under automatic control even though the units resided in another control area. Thus, the problem arose as to how the individual areas, which are interconnected, could appropriately control a jointly owned unit so that each of the areas received the desired regulating capacity from that jointly owned unit as an allocated share of its output to enable the individual areas to meet their commitment to maintain their tie line schedules along with the usual requirements of maintaining frequency.

Others have suggested various ways of controlling such jointly owned units. However, in those systems which have been suggested to date, the methods of control have been inadequate to take into account all of the problems which arise from the allocation of portions of the output of the jointly owned unit to the various interconnected areas having a share in the joint ownership which will operate properly under all conditions.

It is therefore an object of this invention to provide an improved method for controlling the power flow between interconnected power distribution areas while maintaining the system frequency at its preset value and allocating a part of the generation of any jointly owned unit amongst the joint owners so as to provide them with regulating output from that unit.

SUMMARY OF THE INVENTION

In accomplishing the above mentioned object, this invention includes a number of steps for providing the control desired. These steps include the determination of the differences between working set points for each area as determined for a previous period of a control cycle and a corresponding limit constrained desired generation value as determined for the present period of the control cycle. There is then determined the magnitude of those differences of opposite sense which are counter-balancing and a portion of that magnitude is added to the working set points for the previous periods for each of the areas whose difference is of a sense corresponding to the sense of the net difference. That portion is in accordance with the relative values of those differences to the total difference of the same sense. That step is followed by the determination of whether or not the limit of the unit is smaller than the net difference and, alternatively, if the rate limit is smaller there is determined a working set point for the present period by adding additional amounts to each of the working set points as modified by those additions. These added amounts are a proportionate part of the rate limit of the units and the proportionate part is in accordance to the relative ownership interest in the unit and, in the alternative, if the rate limit is larger, the working set point is set for the present period at a value corresponding with the associated limit constrained value generation. There is then provided a setting of the working set point for the present period for each of the remaining areas at a value corresponding to the associated limit constrained desired generation. The jointly owned unit is then controlled to produce an output equal to the sum of those working set points. As an additional part of the control of the system, there is determined the unit error associated with each area by subtracting from the working set points for the present period an allocated desired generation value in the previous period. Then there is determined the magnitude of those unit errors of opposite sense which are counter-balancing and there is added a portion of the counter-balancing magnitude of the unit errors which are in the same sense as the net unit error to the allocated desired generation values for the previous period to obtain the allocated desired generation for the present period, with the portion being in accordance with the relative magnitude of the individual unit error to the total of unit errors in the same sense. In addition, there is a determination of the allocated desired generation for the present period for all remaining areas, which determination is accomplished by adding to the individually allocated desired generation for the previous period the value of the corresponding unit error. There is then determined the effective change in generation for said unit as the difference between the present actual generation and the sum of the allocated desired generations with the determination of the allocated desired generation for the present period by the addition of the value for the present period of a quantity which represents the product of the effective change in generation and the ratio of the associated unit error to the sum of the unit errors. Then there is an allocation to the areas of the actual generation of said unit in accordance with the values of the ratios of the associated allocated desired generation values for the present period to their sum. This is accomplished by a modification of the tie line schedules of each of the areas by adding to that schedule the actual allocated generation for the area and in addition there is a modification of the automatic generation control of each area in accordance with the allocated actual generation which is accomplished by using that allocated value as a feedback signal in the control as by comparing that value with the calculated desired value for the jointly owned unit.

DESCRIPTION OF THE PREFERRED EMBODIMENT

Figure 1:
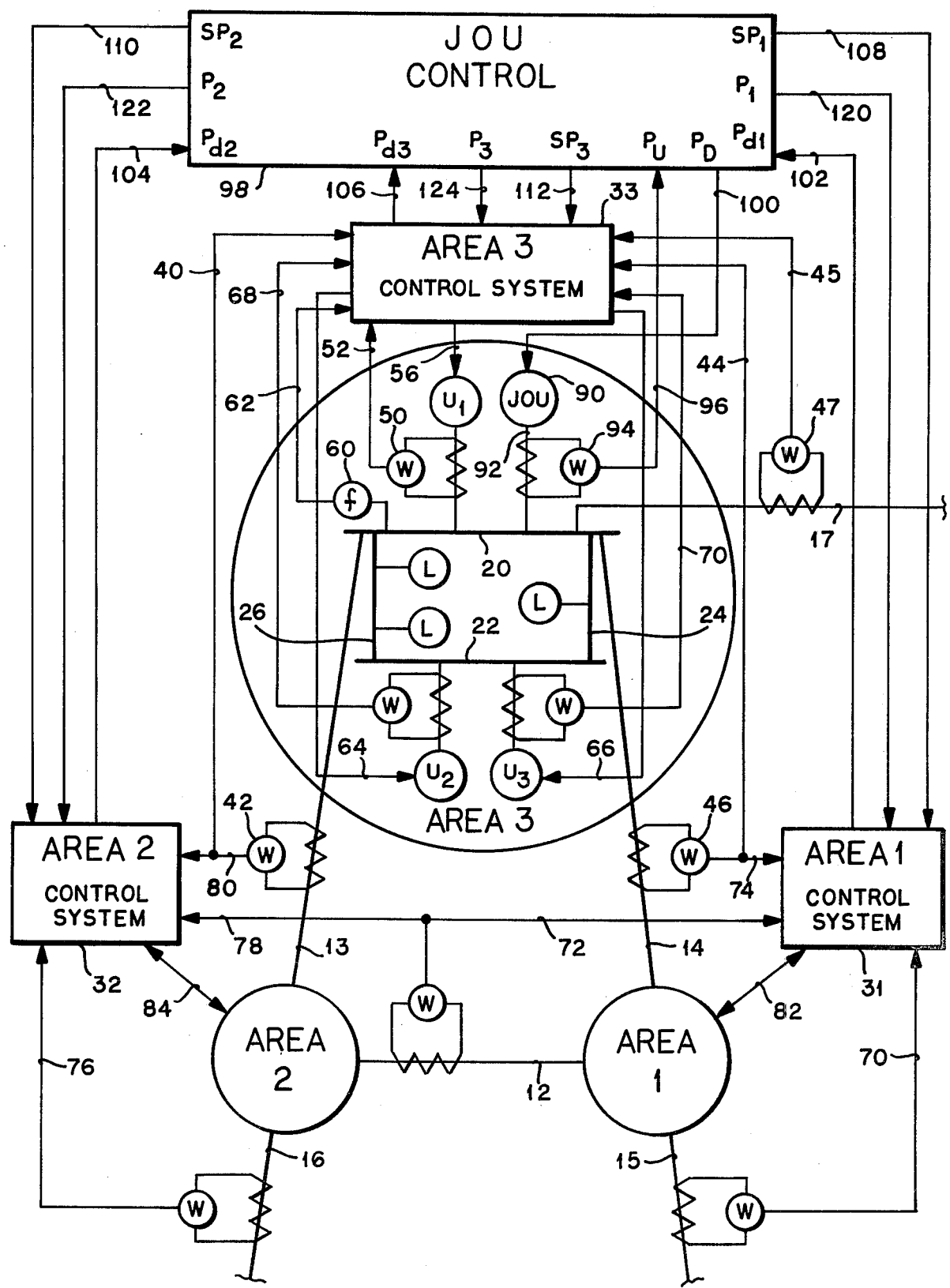
FIG. 1 is a schematic diagram of an interconnected power distribution system having a jointly owned generating unit and is a system of the type for which the present control system is useful.

In FIG. 1 there are shown three power distribution areas, namely areas 1, 2, and 3 which are interconnected to each other by the tie lines 12, 13, and 14 and to other areas by tie lines 15, 16, and 17. Each of the areas includes a number of generating stations and each of these stations is made up of a number of generating units. For example, one of the stations may include the unit $U_1$ as well as a jointly owned unit JOU connected to the station bus 20 while another station includes Units $U_2$ and $U_3$ connected to its bus 22. The two station buses 20 and 22 are shown as being connected by lines 24 and 26 which serve to distribute the generated power to the several loads, L, connected to these lines. Each of the areas has an area control system such as the area control systems 31, 32, and 33 which are respectively used with areas 1, 2, and 3 and operate to control the generation of the individually owned units in the several stations making up those areas as well as the jointly owned unit so that the output of all units serves to maintain the flow of power over the interconnected lines 12–17 at a magnitude predetermined by the tie line schedules assigned to each of the areas, while at the same time maintaining the frequency at its desired value. To accomplish this normal tie line bias control, it is necessary that each of the areas receive as an input a signal indicative of the power flow over the tie lines to that area. Thus, the area control system for area 3 receives over line 40 a signal from the wattmeter 42 which indicates the power flow over tie line 13. In addition, the control system for area 3 receives over lines 44 and 45 signals from wattmeters 46 and 47, respectively, which are indicative of the flow of power over tie lines 14 and 17. The control system for area 3, namely the control system 33, then would normally operate to total the values of the signals received on lines 40, 44, and 45 to obtain the net tie line interchange for area 3, and would compare that value with the desired tie line interchange. The control for area 3 operates to effect a change in the output of the generating capacity of area 3. The output of $U_1$, for example, is measured by wattmeter 50 and is an input signal to the control system on line 52 which can be controlled to the desired generation as represented by the signal sent to the unit controls for unit $U_1$ over line 56. To accomplish the control desired for area 3 it is, of course, necessary to include in the determination of the control action the actual frequency as measured by the frequency meter 60 which supplies a signal indicative of the actual frequency on line 62 to the control system 33.

The units $U_2$ and $U_3$ are likewise subject to control of their outputs in response to signals provided over lines 64 and 66, respectively, from the area control system which signals are indicative of the desired generation from these units. Thus, the area control system 33 will compare signals on lines 64 and 66, respectively, with the signals on lines 68 and 70 which represent the measured output of units $U_2$ and $U_3$ as determined by the associated wattmeters.

Areas 1 and 2 will similarly contain a number of stations interconnected for the distribution of power to the various loads in those areas and the area control system 31 and 32 will operate similarly to the control system utilized for area 3. Thus, area 1 will receive over lines 70, 72 and 74 signals representing the interchange of power over the tie lines connected to area 1, while the signals on lines 76, 78, and 80 are supplied to the area control system 32 for area 2 to provide signals indicative of the interchange of generation connected to area 2. In addition, there is shown a line 82 between area 1 and its control system and a line 84 between area 2 and its control system. These two lines represent the various other data which must be obtained from area 2 and area 1 as well as the information which must be sent to those respective areas for accomplishing the control in the same manner as described for area 3.

So far the description of the control of the output of the various units in the several stations which make up the areas which are interconnected to form the system shown in FIG. 1 operate in accordance with well known principals for the control of such units and there may be utilized any one of a number of control systems as the area control systems for the several areas, namely the systems 31, 32, and 33. Preferably these area control systems are of digital form as may be provided by the use either of special digital computers or programmed general purpose digital computers. The addition of the jointly owned unit 90 as a part of the system of FIG. 1 and the desire of the various interconnected areas to receive regulating output from that unit increases the complexity of the control problem which is presented by the interconnected system of FIG. 1 in that it is desired, as previously pointed out, to allocate portions of the output of the jointly owned unit 90 to each of the interconnected areas 1, 2, and 3 in relationship to the percentage of the financial investment made by those individual areas in the jointly owned unit. Each of the areas having a financial interest in that unit may be considered a participating area or a participating company since the areas are usually representative of that part of the system which is supplied by a particular utility company.

As shown in FIG. 1, the jointly owned unit 90 is connected to the bus 20 and the output of that unit over line 92 is measured by wattmeter 94 which then provides a signal on line 96, which signal is utilized by the jointly owned unit control system 98 as one of the inputs. That input is shown in FIG. 1 by the symbol $P_U$. It will also be noted that the jointly owned unit 90 receives from the control system 98 over line 100 a signal representative of the desired generation or, in other words, the desired output of the unit 90. That signal is represented by the symbol $P_D$. It is thus evident that the control system 98 has for its purpose the production of the signal on line 100, namely $P_D$ as well as appropriate signals for the various control systems for areas 1, 2, and 3 as are required to coordinate the control of the output from the units in each of those areas so as to accommodate that control to the allocated portion of $P_U$ which is assigned to the individual areas so that the output can be taken into account in computing the output for the individually owned units in each of the areas.

In order to provide for the appropriate control functions in each of the area control systems 31, 32, and 33, it is necessary that each of these control systems provide the control system 98 a signal representing the amount of generation from the jointly owned unit 90 which the particular area desired be allocated to it. These signals are respectively represented by the symbols $P_{d1}$, $P_{d2}$, and $P_{d3}$ as supplied by the area control systems over the lines 102, 104, and 106, respectively. With these particular values, the control system 98 operates to produce for the use of each of the area control systems 31, 32, and 33 a working set point such as $SP_1$, $SP_2$, and $SP_3$ which are supplied to the control systems over lines 108, 110, and 112, respectively. The control system for the jointly owned unit also produces the signals $P_1$, $P_2$, and $P_3$ which represent the portion of the present output of the jointly owned unit 90 which is allocated to those respective areas. Those signals are supplied to the control systems for the respective areas over lines 120, 122, and 124. The manner in which the measured value $P_U$ along with the signal from the various control system, namely $P_{d1}$, $P_{d2}$, and $P_{d3}$ is used to produce $P_1$, $P_2$, and $P_3$ as well as $SP_1$, $SP_2$, and $SP_3$ is described below in the discussion of the control algorithm set forth by FIGS. 2a–2d. That control algorithm is an algorithm designed for use in a digital control system, thus the control system 98 is desirably a digital control system which may utilize a special purpose digital computer or a general purpose digital computer designed to carry out the programmed steps set forth in the algorithm of FIGS. 2a–2d.

Figure 2A:
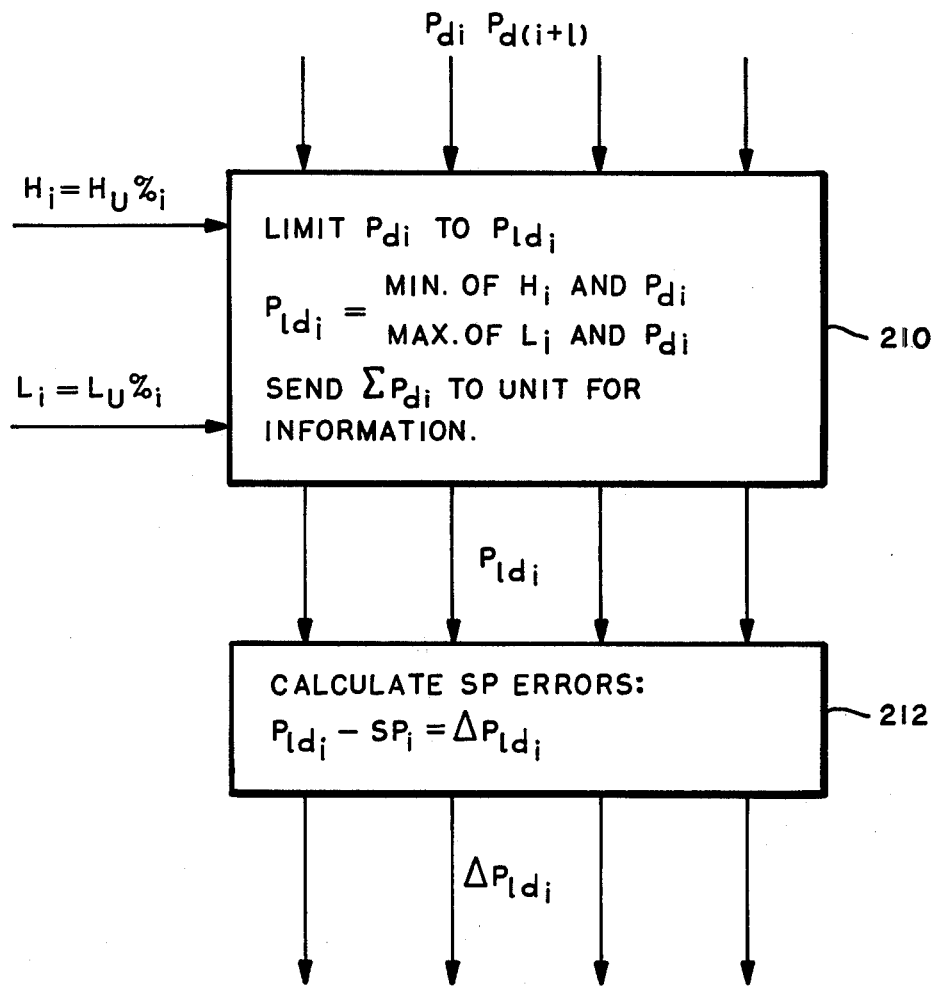
FIGS. 2a–2d make up the control algorithm which sets forth the preferred procedures to be followed in the control of the interconnected system of FIG. 1 for allocation of the generation of the jointly owned unit.
Figure 2B:
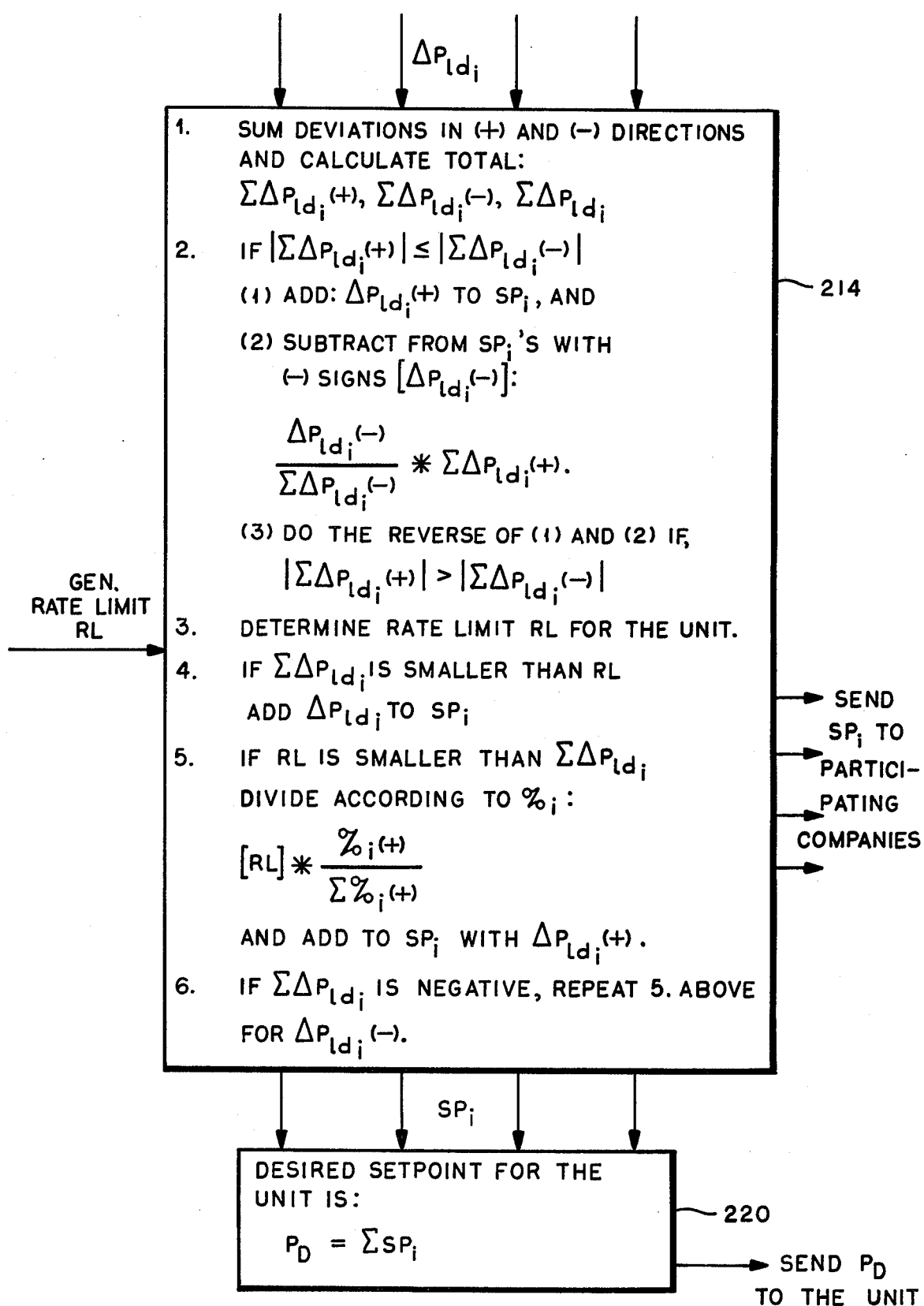

The various steps of the algorithm which serve to control the power flow of the interconnected power distribution areas including the jointly owned unit begins with that part of the algorithm shown in FIG. 2a. In FIG. 2a the first step is to provide the program with input signals which may be either manually or automatically determined and which are of value indicative of the desired generation for each of the participating companies or areas or, in other words, the generation which each of the joint owners desires to obtain as its allocation from the jointly owned unit for purposes of regulating its own system. As shown in block 210 of the algorithm, the desired generation values $P_{di}$ are limited to $P_{1di}$ where $P_{1di}$ is equal to the lowest of the values $H_i$ or $P_{di}$ where $H_i$ represents the high limit for the ith area or $P_{1di}$ is the highest of the values $L_i$ or $P_{di}$ where $L_i$ represents the low limit for the ith area. As shown, the limit inputs to the block 210, namely $H_i$ and $L_i$ are determined as percentages of the high and low limits of the jointly owned units, namely $H_U$ and $L_U$, which limits are set in accordance with the percentage ownership of the ith company or area. It also is indicated in block 210 that the value of the signal $\Sigma P_{di}$ is sent to the jointly owned unit for information purposes and the values $P_{1di}$ are then utilized for the next step in the algorithm as shown in block 212.

The step in block 212 calculates the working set point errors by subtracting the individual working set points which were determined in the previous period of the control cycle, $SP_i$, from the corresponding limit constrained desired generation value, $P_{1di}$, in the present period, thus obtaining $\Delta P_{1di}$ as the difference. This difference is calculated for each of the areas or companies and are then utilized in the next step of the algorithm as shown in block 214 (FIG. 2b) where the first step is to sum the deviations in plus and minus directions as well as determining the net difference, thus obtaining $\Sigma \Delta P_{1di}$ (+), $\Sigma \Delta P_{1di}$ (−), and $\Sigma \Delta P_{1di}$. Those plus and minus differences are counter-balancing in that the jointly owned unit need not change generation to accommodate those differences. The next part of the algorithm as shown in block 214 requires the determination as to whether or not the differences in the increase sense are less than the differences in the decrease sense. If they are, then the differences in the increase sense are added to the magnitude for the corresponding working set points for the previous period. Thus, we have in effect set the working set point for the present period at a value corresponding to the associated limit constrained desired generation. We have determined by comparing the differences in the increase and decrease sense which sense is the sense of the net difference. Thus, if the differences in the increase sense are less than the differences in the decrease sense, the sense of the net difference is the decrease sense and we must add a portion of the magnitude of the counter-balancing differences to the working set points for the previous periods for each of the areas whose difference is of a sense corresponding to the net sense, namely the decrease sense. That portion is determined in accordance with the relative value of those differences to the total of the difference of the same sense. Thus, the portion is determined in accordance with $$\frac{\Delta P_{1di}(-)}{\Sigma \Delta P_{1di}(-)}$$

As indicated by the third part of step 2 in block 214, if the sense of the net difference is opposite to that previously discussed, then the reverse of the second part of step 2 is carried out.

The subsequent steps set forth in block 214 of FIG. 2a include determining the rate limit RL for the unit (the jointly owned unit). That rate limit is the limited rate at which the generator can change generation. If the total desired change in the set points as represented by $\Sigma \Delta P_{1di}$ is smaller than the rate limit, then step 4 in block 214 is followed and $\Delta P_{1di}$ is added to $SP_i$. If $\Sigma \Delta P_{1di}$ is larger than RL, then the working set points for the present period is determined by adding additional amounts to each of the set points as modified by the additions made previously in block 214, with those additional amounts being a proportionate part of the rate limit of the unit with that proportionate part being in accordance with the relative ownership interest in the unit possessed by the areas associated with the differences in the sense of the net difference as, for example, $$\frac{\%_i(+)}{\Sigma \%_i(+)}$$

where the net difference is in an increase direction. If the net difference is in a negative or decrease direction, then a comparable proportionate part of the companies requesting a change in that direction is calculated.

As indicated by block 214, the information as to the rate limit of the generator which is jointly owned is information which is provided to the control computer 98 of FIG. 1 and the result of the calculation of $SP_i$ by the steps in block 214 then provides values for $SP_i$ which are sent to the participating companies or, in other words, to the areas having financial interest in the jointly owned unit where that value becomes useful in the control system of the individual areas and particularly is effective in preventing wind-up of those control systems if they are characterized by a mode of operation which is likely to have an incipient wind-up problem.

The updated rate limited working set points $SP_i$ calculated in block 214 are then utilized in the step of the algorithm shown in block 220 where they are summed to determine the desired set point for the jointly owned unit $P_D$, which value is then sent to the jointly owned unit and in particular to its control system so that the control system for the jointly owned unit can operate the jointly owned unit so as to produce that output.

Figure 2C:
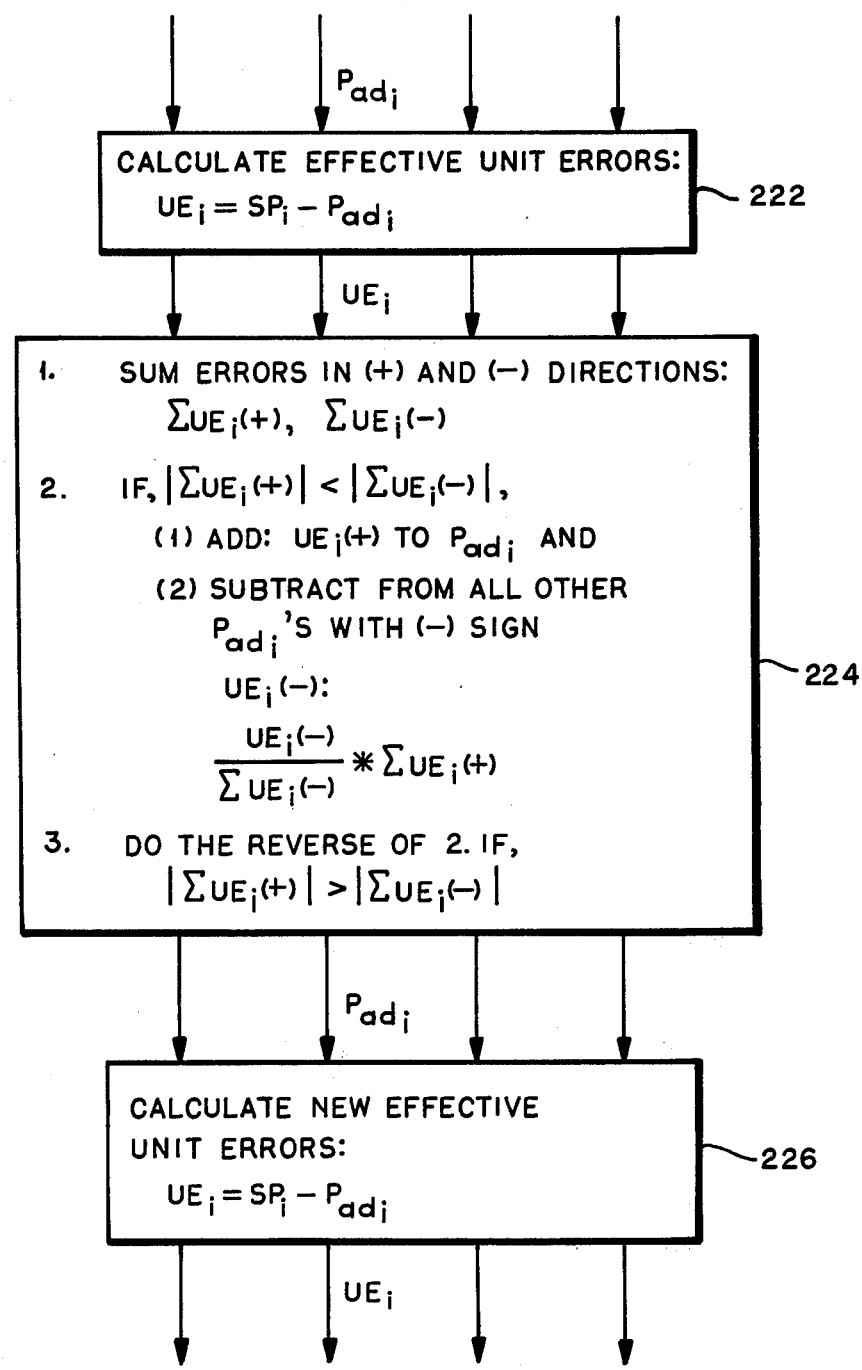

In FIG. 2c the step of the algorithm shown in block 222 utilizes the allocated desired generation values $P_{adi}$ for the previous period of the control cycle of the computer 98 to calculate the net errors associated with the areas as by subtracting from the corresponding set point for the present period the allocated desired generation values. The unit errors are then utilized in the subsequent steps of the algorithm as in block 224 where there is first determined the magnitude of those unit errors which are of opposite sense and which are counter-balancing as by summing the errors in the plus and minus directions. If the sum of the unit errors in the plus direction are less than the sum of the unit errors in the minus direction as postulated in step 2 of block 224, there is determined the allocated desired generation for the present period for all areas in the same sense as the net unit errors or, in other words, in the plus direction as shown in step 2 in the first part, which shows that determination as being made by adding $UE_i(+)$ to $P_{adi}$. Of course, if the net error is in the plus direction, the reverse of step 2 is carried out. Also, a portion of the magnitude of the counter-balancing unit errors which in the present case would be the magnitude of the positive errors are subtracted from the allocated desired generation values for the previous period to obtain the allocated desired generation for the present period with the portion being in accordance with the relative magnitude of the individual errors to the total of the unit errors in the same sense, which is shown in the second part of step 2 as $$\frac{UE_i(-)}{\Sigma UE_i(-)}$$

The calculated values of $P_{adi}$ are then utilized as set forth in block 226 to calculate the new effective unit errors as by subtracting those values from the corresponding working set points to then obtain new values of $UE_i$ shown as outputs in block 226.

Figure 2D:
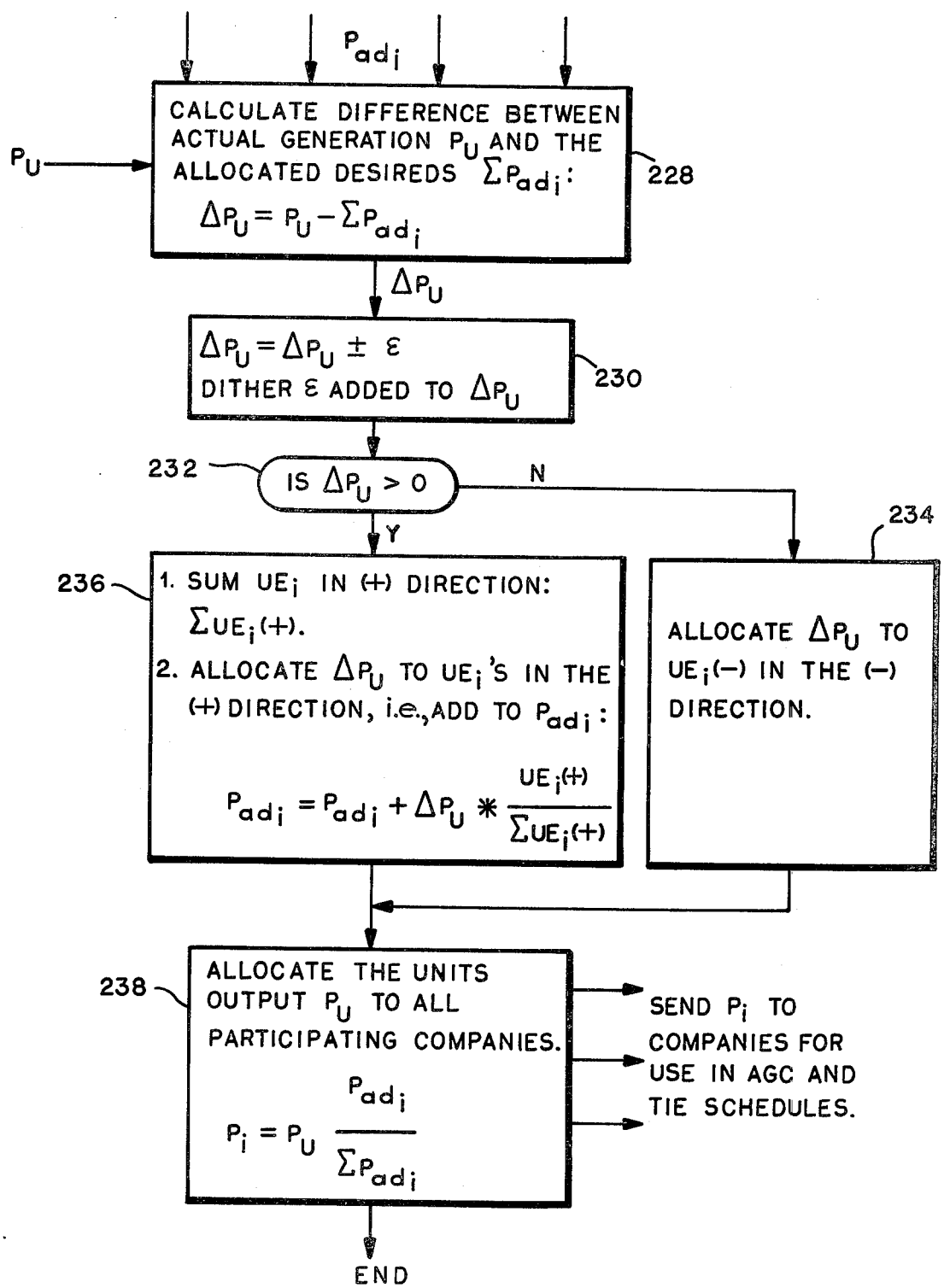

As shown in the algorithm of FIG. 2d, a determination is made by the step shown in block 228 as to the value of the effective change in generation for the jointly owned unit. That determination is made by calculating the difference between the present actual generation $P_U$ and the sum of the allocated desired generation, $\Sigma P_{adi}$.

As shown in block 230, the quantity $\Delta P_U$ as calculated in block 228 is increased or decreased by the value $\epsilon$, representing a dither, which is added to that value to make sure that the control system always moves towards a maintenance of the desired values for the various quantities being calculated. There is then determined as in block 232 whether $\Delta P_U$ is greater than zero and if it is not, an allocation of $\Delta P_U$ to $UE_i(-)$ is made as suggested in block 234. That allocation is carried out in the same manner as the allocation in the plus direction as described subsequently with regard to block 236. It will be evident that if $\Delta P_U$ is greater than zero, the steps of the algorithm shown in block 236 are to be carried out and that it includes the summation of the unit errors in the plus direction with an allocation of $\Delta P_U$ to the unit errors in the plus direction being added to the updated allocated desired generation value $P_{adi}$ to thereby determine the allocated desired generation for the present period as by adding to the value for the previous period a quantity which represents the product of the effective change in generation $\Delta P_U$ and the ratio of the associated unit error to the sum of the unit errors, which rate is shown in the block 236 as $$\frac{UE_i(+)}{\Sigma UE_i(+)}$$

There is then provided by the steps in block 238 an allocating to the areas of the actual generation of the jointly owned units, namely $P_U$ in accordance with the values of the ratios of the associated allocated desired generation values for the present period to their sum, namely $$\frac{P_{adi}}{\Sigma P_{adi}}$$

That step for determining $P_i$ is shown in FIG. 2d, namely in block 238 as the last step in the calculation of the values utilized for the control of the interconnected power distribution areas. The values $P_i$ are sent to the areas or participating companies for use in their automatic generation control and for modification of the tie line schedules as used in their control systems. Thus, there is in each area control system a modifying of the tie line schedules in those areas by the addition to the schedule of the allocated actual generation for the area and there is a modifying of the automatic generation control for each area in accordance with the allocated actual generation as by using that allocated value as a feedback signal in the control system where it may be compared, for example, with the value which is calculated as the desired generation from the jointly owned unit as determined in that area.

It will be evident from the above steps of the algorithm for the digital control computer 98 in FIG. 1 that the values $SP_1$, $SP_2$, and $SP_3$ for FIG. 1 have been obtained by the steps in block 214 and the values $P_1$, $P_2$, and $P_3$ have been obtained by the step in block 238 by following the steps set forth in the algorithm and based upon the values of $P_{d1}$, $P_{d2}$, and $P_{d3}$ which are utilized as inputs to the block 210 in the algorithm.

It will also be evident to those skilled in the art that the steps of the algorithm may in some cases be carried out in different order than that recited above without in any way changing the meaning of the various quantities calculated in the algorithm and without in any way changing the resultant control.

DEFINITIONS OF SYMBOLS $P_D$—Desired setpoint for the generating unit.
$P_{di}$—Desired generation of the ith participating company.
$P_i$—Allocated generation of unit's output to the ith company.
$P_U$—Actual output of the unit.

$SP_i$—Working setpoint for desired generation.
$L_U$—Low load limit for the unit.
$H_U$—High load limit for the unit.
$H_i$, $L_i$—High and low limits allocated to the companies.

$$H_i = \%_i * H_U$$

RL—Generation rate limit for the unit.
$\%_i$—Percentage (relative) ownership of ith company.
$\Sigma\%_i(+)$—Sum of percentage (relative) ownership of companies requesting an increase in generation.
$\%_i(+)$—Percentage ownership of ith company requesting an increase in generation.
$P_{adi}$—Allocated desired generation to ith company.
$P_{ldi}$—Desired generation of ith company limited to $H_i$ or $L_i$.
$\Delta P_{ldi} = P_{ldi} - SP_i$—Difference between limited desired and working setpoint.
$UE_i = SP_i - P_{adi}$—Unit error—Difference between working setpoint and allocated desired.
$\Delta P_U = P_U - \Sigma P_{adi}$—Effective change in units generation since last control interval.
(+)—Indicates an increase requirement.
(−)—Indicates a decrease requirement.
i—Subscript denoting ith owner company.
o—Subscript denoting owner-operator ith company.
$\Sigma$—Indicates a sum.
$\Delta$—Indicates a difference. $\epsilon$—Dither added to $\Delta P_U$.

What is claimed is:

1. A method for controlling the power flow between interconnected power distribution areas while maintaining system frequency at a preset value and allocating a part of the generation of a jointly owned unit to each of the joint owners so as to provide for them a regulating output from said unit, comprising the steps of:

determining the individual differences between working set points determined for each area in a previous period of a control cycle and corresponding limit constrained desired generation values for the present period;

determining the magnitude of those differences of opposite sense which are counter-balancing and the net difference;

adding said individual differences to the corresponding working set points for the previous period for each of the areas whose difference is of a sense opposite that of the net difference;

adding a portion of said magnitude to the working set points for the previous period for each of the areas whose difference is of a sense corresponding to the sense of the net difference, said portion being in accordance with the relative values of those differences to the total of the differences of the same sense as the net difference;

determining if the rate limit of the unit is smaller than said net difference; and alternatively, if the rate limit is larger,
adding said individual differences to the corresponding working set points, and
if the rate limit is smaller,
determining a working set point for the present period by adding additional amounts to each of the working set points as modified by said addition of portions of said magnitude, said additional amounts being a proportionate part of the rate limit of the unit, said proportionate part being in accordance with the relative ownership interests in the unit possessed by the areas associated with differences in the sense of the net difference;

determining the set point for said unit by summing said working set points for the area;

controlling said unit to produce an output equal to said unit set point;

determining the unit error associated with each area by subtracting from the working set points for the present period an allocated desired generation value for the previous period;

determining the magnitude of those unit errors of opposite sense which are counter-balancing;

adding to the individual allocated desired generation values for the previous period for all areas whose unit error is of sense opposite the net unit error the value of the corresponding unit error;

adding a portion of the counter-balancing magnitude of the unit errors which are in the same sense as the net unit error to the allocated desired generation values for the previous period to obtain the allocated desired generation values for the present period, said portion being in accordance with the relative magnitude of the individual unit errors to the total of the unit errors in the same sense;

determining a new effective unit error by subtracting from said working set points the allocated desired generation values;

determining the effective change in generation for said unit as the difference between the present actual generation and the sum of the allocated desired generation values;

determining the allocated desired generation for the present period for units having unit errors of the same sense as the effective change in generation by adding to the value for the previous period a quantity which represents the product of said effective change in generation and the ratio of the associated unit errors to the sum of the unit errors;

allocating to the areas the actual generation of said unit in accordance with the values of the ratios of the associated allocated desired generation values for the present period to their sum;

modifying the tie-line schedule of each of the areas by adding to the schedule the allocated actual generation for the area; and modifying the automatic generation control of each area in accordance with said allocated actual generation by using said allocated value as a feedback signal in said control by comparing that value with the calculated desired generation value computed by the areas as their requirement for generation from the jointly owned unit.

2. Apparatus for controlling the power flow between interconnected power distribution areas while maintaining system frequency at a preset value and allocating a part of the generation of a jointly owned unit to each of the joint owners so as to provide for them a regulating output from said unit, comprising:

a digital computer programmed to carry out the steps of:

determining the individual differences between working set points determined for each area in a previous period of a control cycle and corresponding limit constrained desired generation values for the present period, determining the magnitude of those differences of opposite sense which are counter-balancing and the net difference, adding said individual differences to the corresponding working set points for the previous period for each of the areas whose difference is of a sense opposite that of the net difference, adding a portion of said magnitude to the working set points for the previous period for each of the areas whose difference is of a sense corresponding to the sense of the net difference, said portion being in accordance with the relative values of those differences to the total of the differences of the same sense as the net difference, determining if the rate limit of the unit is smaller than said net difference; and alternatively, if the rate limit is larger, adding said individual differences to the corresponding working set points, and if the rate limit is smaller, determining a working set point for the present period by adding additional amounts to each of the working set points as modified by said addition of portions of said magnitude, said additional amounts being a proportionate part of the rate limit of the unit, said proportionate part being in accordance with the relative ownership interests in the unit possessed by the areas associated with differences in the sense of the net difference;

determining the set point for said unit by summing said working set points for the area, determining the magnitude of those unit errors of opposite sense which are counter-balancing, adding to the individual allocated desired generation values for the previous period for all areas whose unit error is of sense opposite the net unit error the value of the corresponding unit error, adding to the individual allocated desired generation values for the previous period for all areas whose unit error is of sense opposite the net unit error the value of the corresponding unit error, adding a portion of the counter-balancing magnitude of the unit errors which are in the same sense as the net unit error to the allocated desired generation values for the previous period to obtain the allocated desired generation values for the present period, said portion being in accordance with the relative magnitude of the individual unit errors to the total of the unit errors in the same sense, determining a new effective unit error by subtracting from said working set points the allocated desired generation values, determining the effective change in generation for said unit as the difference between the present actual generation and the sum of the allocated desired generation values, determining the allocated desired generation for the present period for units having unit errors of the same sense as the effective change in generation by adding to the value for the previous period a quantity which represents the product of said effective change in generation and the ratio of the associated unit errors to the sum of the unit errors, and allocating to the areas the actual generation of said unit in accordance with the values of the ratios of the associated allocated desired generation values for the present period to their sum;

means for controlling said unit to produce an output equal to said unit set point;

means for modifying the tie-line schedule of each of the areas by adding to the schedule the allocated actual generation for the area; and means for modifying the automatic generation control of each area in accordance with said allocated actual generation by using said allocated value as a feedback signal in said control by comparing that value with the calculated desired generation value computed by the areas as their requirement for generation from the jointly owned unit.

* * * * *